May 28, 1968  J. C. MARTIN  3,385,201
COLD WATER POUR IN BEVERAGE MAKER
Filed Feb. 13, 1967  7 Sheets-Sheet 1
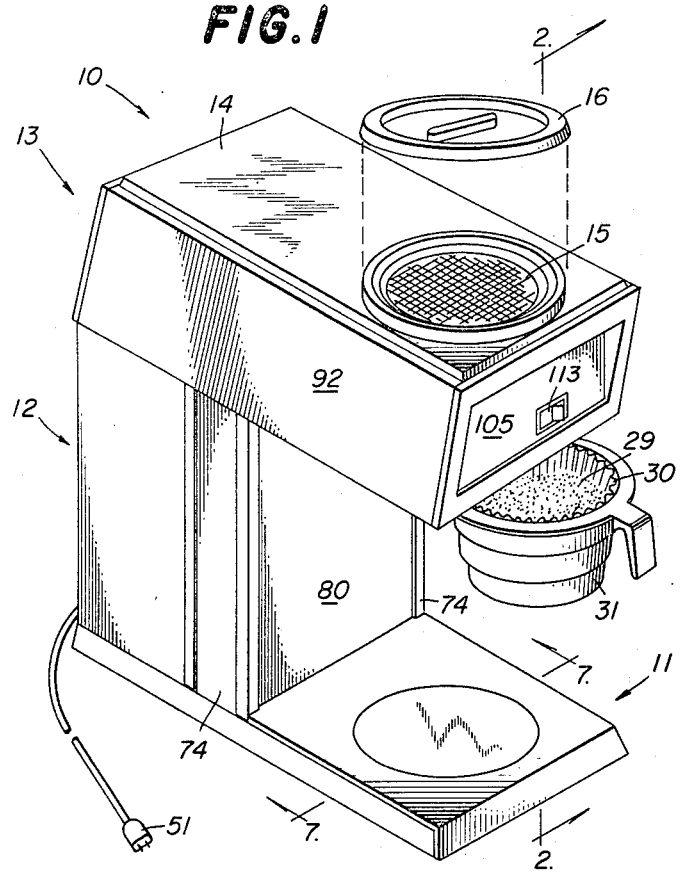
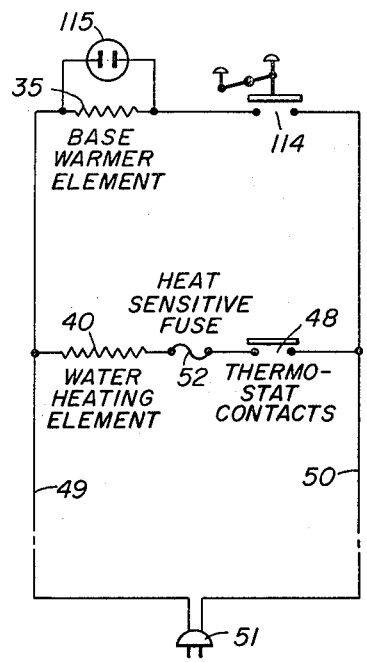
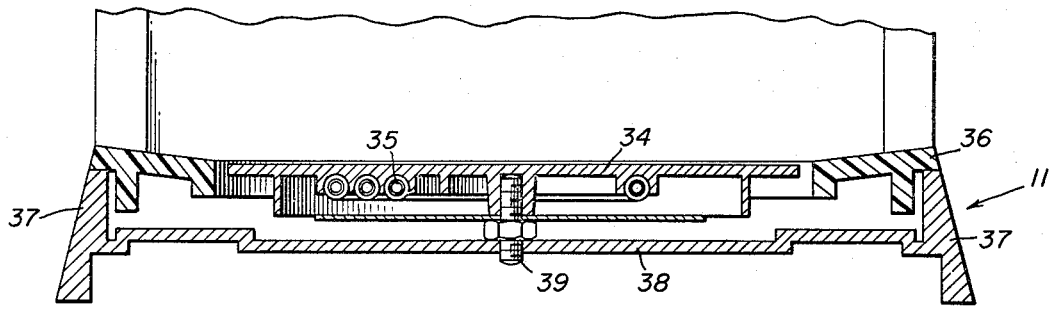

May 28, 1968   J. C. MARTIN   3,385,201
COLD WATER POUR IN BEVERAGE MAKER
Filed Feb. 13, 1967   7 Sheets-Sheet 2

May 28, 1968  J. C. MARTIN  3,385,201
COLD WATER POUR IN BEVERAGE MAKER
Filed Feb. 13, 1967  7 Sheets-Sheet 3

May 28, 1968            J. C. MARTIN            3,385,201
COLD WATER POUR IN BEVERAGE MAKER
Filed Feb. 13, 1967            7 Sheets-Sheet 4
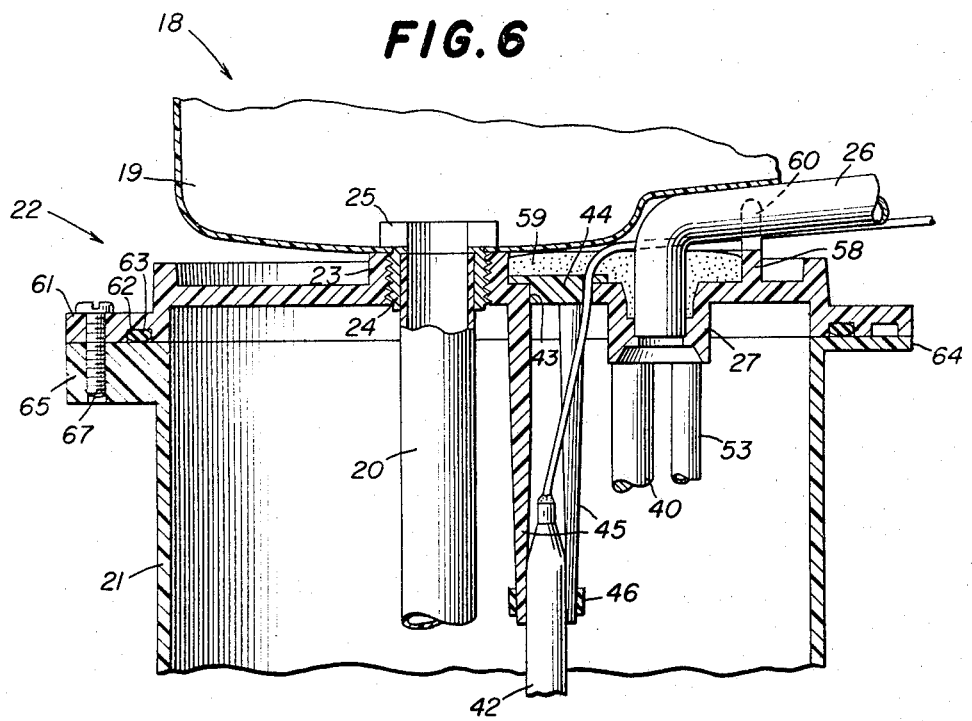
FIG. 6
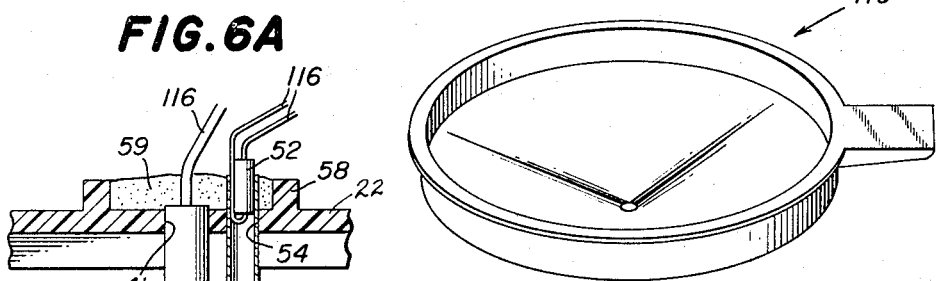
FIG. 6A
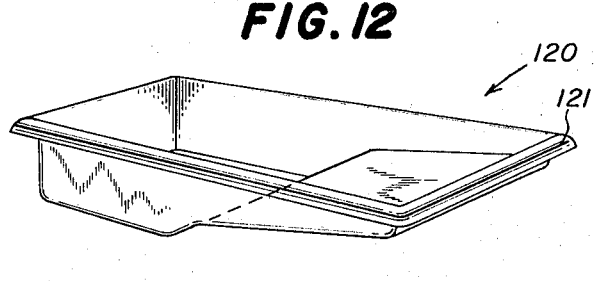
FIG. 11
FIG. 12

May 28, 1968  J. C. MARTIN  3,385,201
COLD WATER POUR IN BEVERAGE MAKER
Filed Feb. 13, 1967  7 Sheets-Sheet 5

May 28, 1968 J. C. MARTIN 3,385,201
COLD WATER POUR IN BEVERAGE MAKER
Filed Feb. 13, 1967 7 Sheets-Sheet 6

# United States Patent Office 3,385,201
Patented May 28, 1968

3,385,201
COLD WATER POUR IN BEVERAGE MAKER
John C. Martin, Springfield, Ill., assignor to Bunn-O-Matic Corporation, Springfield, Ill., a corporation of Delaware
Filed Feb. 13, 1967, Ser. No. 615,449
18 Claims. (Cl. 99—282)

ABSTRACT OF THE DISCLOSURE

Water for making coffee, tea, etc., is electrically heated in a tank of non-metallic heat insulating material and is siphoned out when cold water is poured into a shallow basin of similar material connected to the tank, secured to an enclosing hood, and overlying the electrical connections to a heater in the tank and electrical controls including an ambient temperature protective device for the heater. The hood and tank enclosure are formed by metallic extrusions and metallic trunk wrappers or by a one piece molding of non-metallic heat insulating material which has the basin molded integrally therewith.

---

This invention relates to beverage making devices and constitutes an improvement over the coffee making machine disclosed in Patent No. 3,220,334, issued Nov. 30, 1965 and the art referred to therein.

Among the objects of this invention are: To provide a machine for making beverages, such as coffee and tea, requiring a supply of hot water, that can be manufactured by mass production methods and is particularly adapted for use in homes, small offices and like locations; to employ for the tank in which the water is heated non-metallic heat insulating material, such as a high temperature molded thermoplastic material; to heat the water in such a tank electrically and to provide ambient temperature responsive means for interrupting the flow of current to the heating means should the temperature reach a value substantially less than that which might damage the tank; to mount the electric heating and thermostatic control means therefor in the cover for the tank by a potting compound; to provide a basin of non-metallic electrical and heat insulating material connected at its bottom to an inlet water line to the water tank for receiving cold water to displace hot water in the tank and to overlie the electrically energized conductors for the heating means and controls therefor to prevent access thereto; to enclose the tank by a trunk means and the basin by hood means; to form the tank means by side members of extruded metal interconnected by metallic front and rear trunk wrappers; to form the hood means by side members of extruded metal interconnected by end caps; to movably mount a cover on the hood means thereby permitting access to the basin for inspection and cleaning purposes, the cover having an opening through which cold water can be poured for flow into the tank to displace hot water therefrom; to slidably mount the cover on the hood means; to provide the basin with a rim having an inverted U-shaped cross section for overlying the upper edges of the hood side members and end caps; and to form the major portion of the trunk means, the hood means and the basin as a one piece molding of non-metallic heat insulating material.

Figure 2:
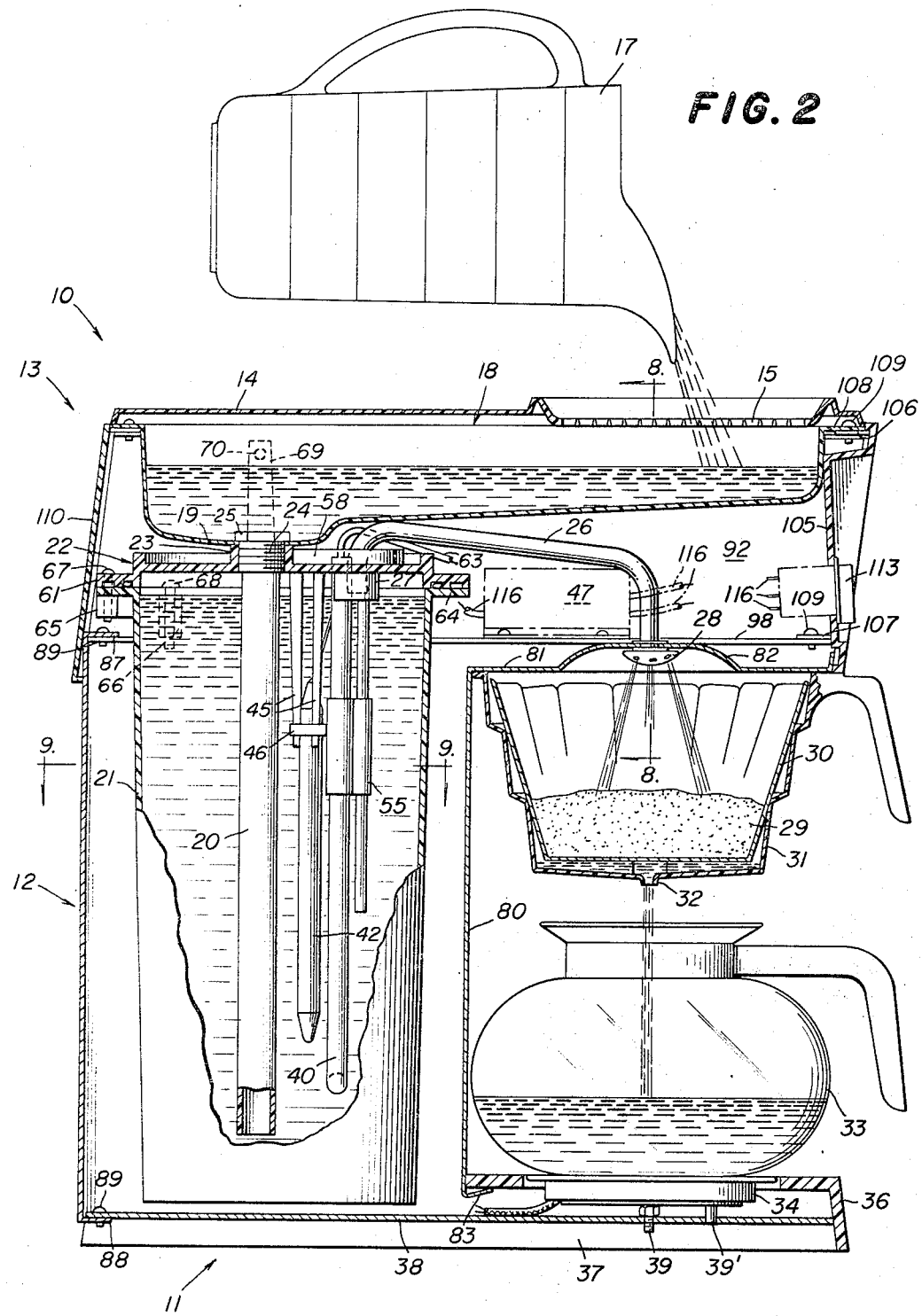
Figure 3:
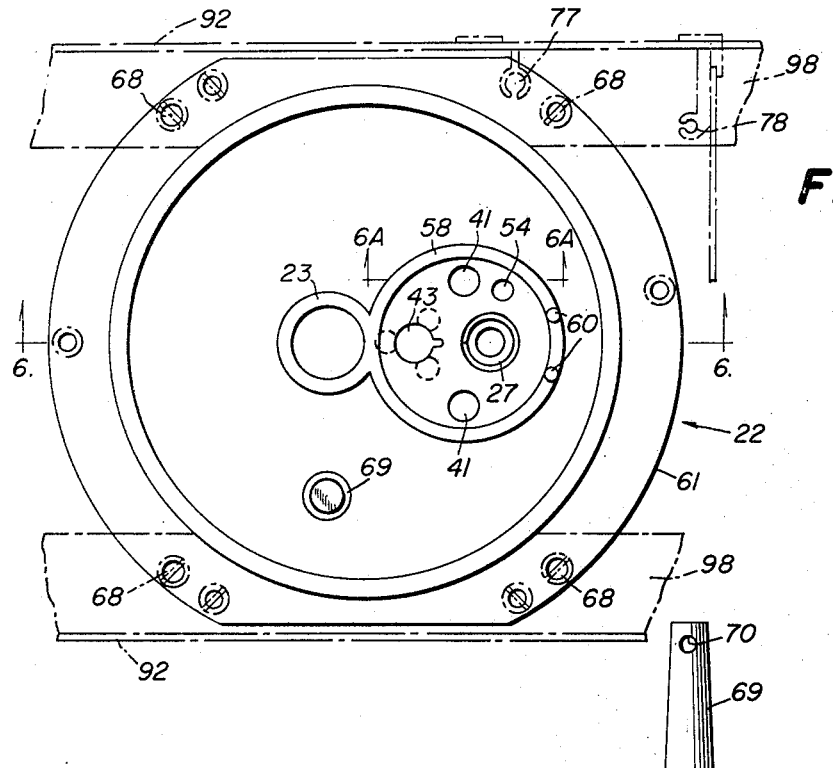
Figure 4:
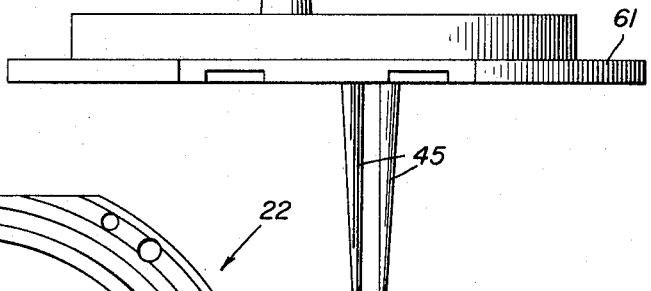
Figure 5:
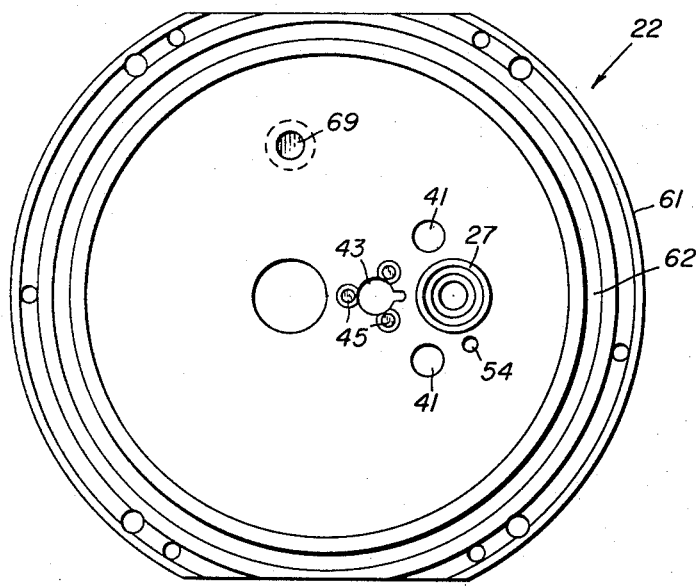
Figure 9:
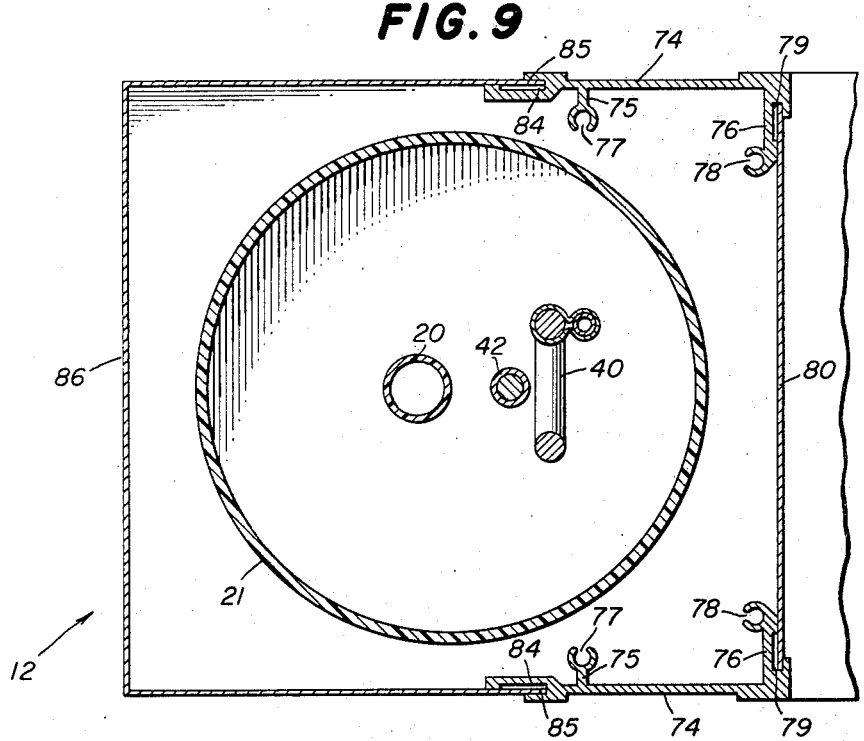
Figure 8:
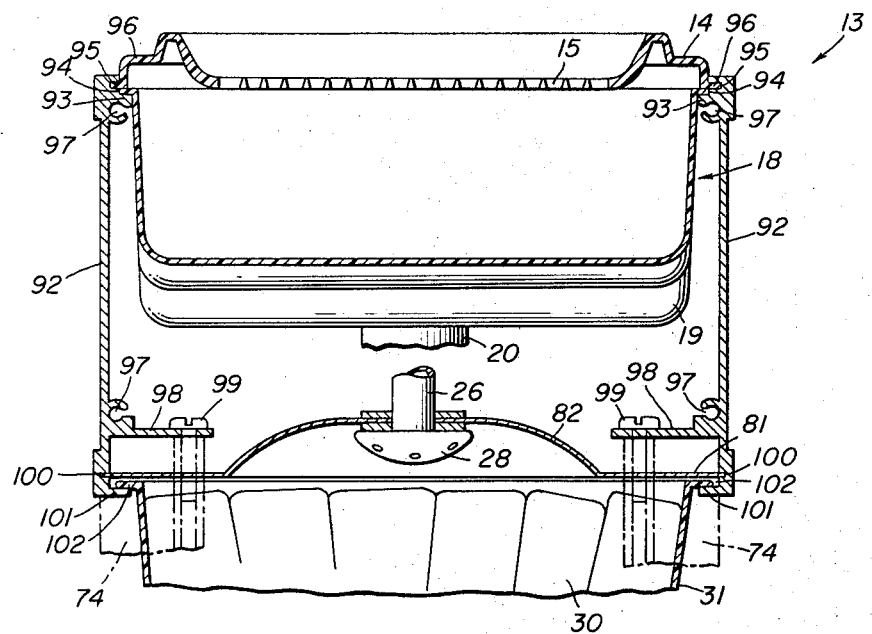
Figure 13:
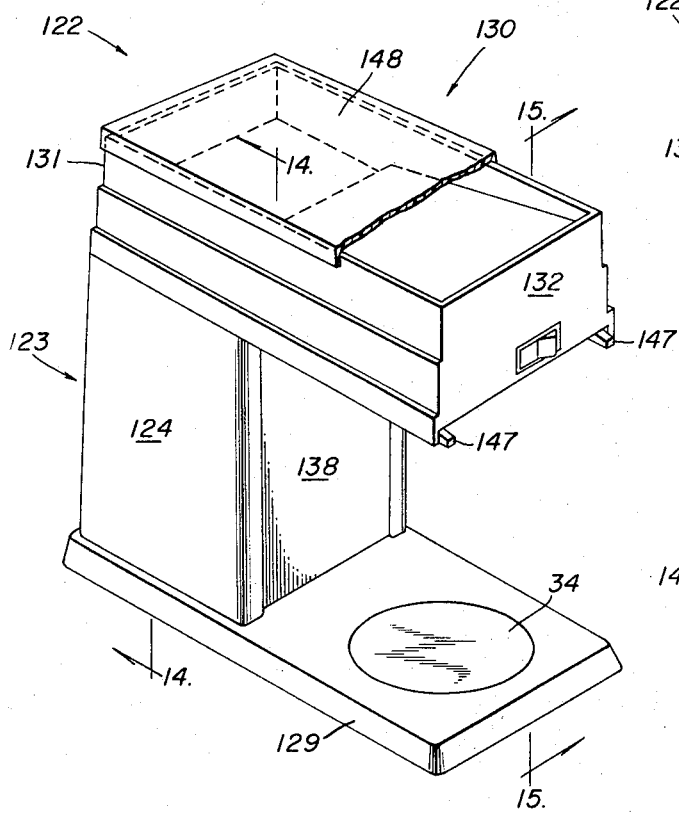
Figure 14:
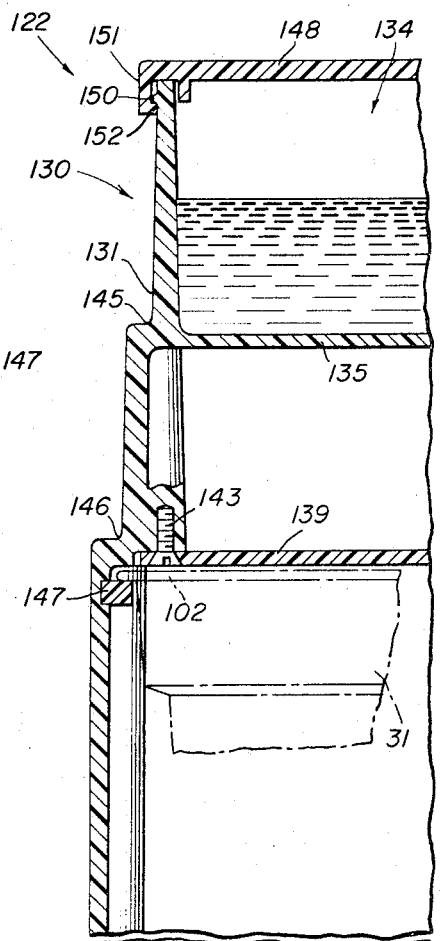
Figure 17:
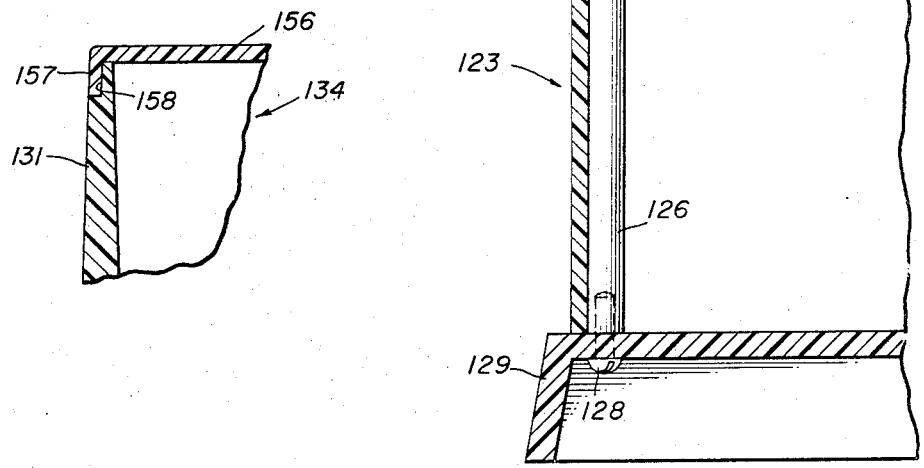
Figure 15:
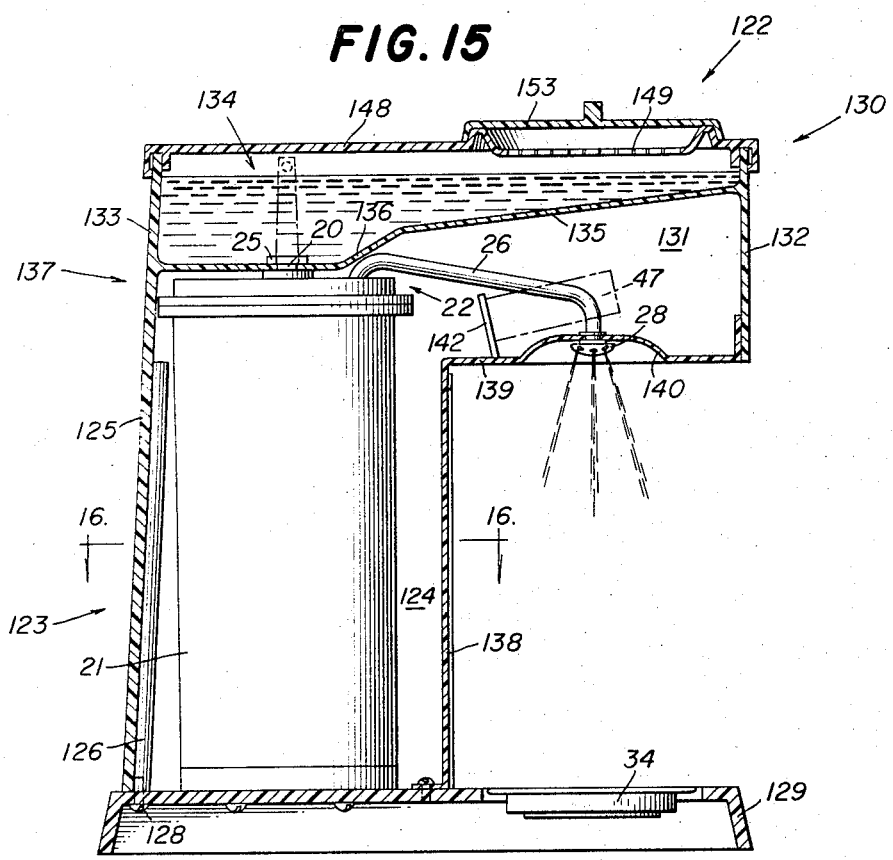
Figure 16:
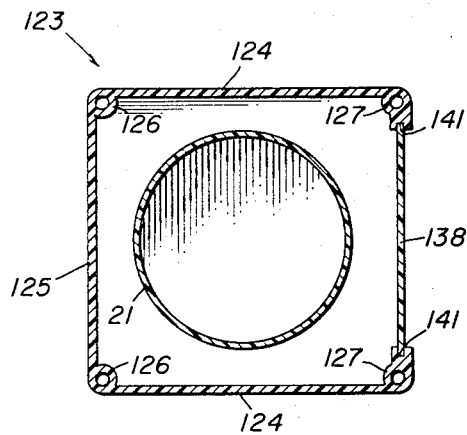

In the drawings: FIG. 1 is a perspective view of a beverage maker embodying certain features of this invention. FIG. 2 is a vertical sectional view taken generally along the line 2—2 of FIG. 1, the view being at an enlarged scale. FIG. 3 is a top plan view, at an enlarged scale of the cover for the water tank, certain mounting parts associated therewith being shown by broken lines. FIG. 4 is a view, in side elevation, of the cover shown in FIG. 3. FIG. 5 is a bottom plan view of the cover shown in FIG. 3. FIG. 6 is a vertical sectional view, at an enlarged scale, taken generally along the line 6—6 of FIG. 3 and showing, in addition, certain related parts not shown in FIG. 3. FIG. 6A is a vertical sectional view at an enlarged scale taken generally along the line 6A—6A of FIG. 3 and showing certain related parts not shown in FIG. 3. FIG. 7, sheet 1, is a vertical sectional view at an enlarged scale taken generally along the line 7—7 of FIG. 1. FIG. 8 is a vertical sectional view at an enlarged scale taken generally along the line 8—8 of FIG. 2. FIG. 9 is a horizontal sectional view at an enlarged scale taken generally along the line 9—9 of FIG. 2. FIG. 10, sheet 1, is a circuit diagram of the electrical connections for the beverage maker shown in FIG. 1. FIG. 11, sheet 4, is a perspective view of a shallow funnel that can be employed when the beverage maker is employed solely to provide hot water. FIG. 12, sheet 4, is a perspective view of an alternate construction for the cold water receiving basin. FIG. 13 is a perspective view of a modified form of the beverage maker in which the major portion of the trunk means, the hood means and the cold water receiving basin are formed as a one-piece molding of non-metallic heat insulating material. FIG. 14 is a vertical sectional view, at an enlarged scale, taken generally along the line 14—14 of FIG. 13. FIG. 15 is a vertical sectional view, taken generally along the line 15—15 of FIG. 13. FIG. 16 is a horizontal section taken generally along the line 16—16 of FIG. 15. FIG. 17, sheet 6, is a vertical sectional view of an alternate joint construction for the removable cover on the hood means.

In FIGS. 1 and 2 a beverage making machine is indicated, generally, at 10 which can be employed for heating water for coffee or tea making purposes and the like. The beverage making machine includes a horizontal base member 11 on which trunk means, shown generally at 12, is mounted for carrying hood means, shown generally at 13, at its upper end. A rectangular cover 14 is movably mounted on the hood means 13 and includes a screened opening 15 that can be closed off by a circular cover 16. As shown in FIG. 2 a pitcher 17 can be employed for pouring cold water through the screened opening 15 into a basin that is indicated, generally, at 18. The basin 18 is relatively shallow and is rectangular in configuration. It is formed of non-metallic heat insulating material that can be molded. For example the basin 18 for receiving cold water from the pitcher 17 can be formed of polyphenylene oxide plastic. However, other similar materials can be employed. The basin 18 has a relatively deep rotion 19 which communicates with an inlet water line 20 to a water tank 21 in which the water is maintained at a predetermined elevated temperature in a manner to be described. The relatively deep portion 19 of the shallow basin 18 is provided to insure that all of a relatively small amount of water, such as two cups of water, in the basin 18 will flow completely out of it through the inlet water line 20 into the water tank 21. A cover 22 closes off the upper end of the water tank 21.

The water tank 21 and cover 22 both are formed on non-metallic heat insulating material such as polyphenylene oxide plastic. This material is preferred since it can withstand a relatively high temperature without distortion and also it does not react with the water under high temperature conditions. This material can safely withstand temperatures up to 375° F., a temperature which is substantially in excess of the boiling point of water at atmospheric pressure. This is the same material, as noted, as that of which the basin 18 is formed.

The cover 22, FIG. 6, has an upstanding integral threaded flange 23 that is arranged to receive a threaded upper end 24 of the inlet water line 20. The inlet water line 20 is formed of non-metallic heat insulating material and the threaded upper end 24 is secured thereto by a suitable adhesive. A transverse slot 25 permits the out flow of all of the water that may be poured into the relatively deep portion 19 of the basin 18. The lower end of the inlet water line 20, FIG. 2, opens near the bottom of the tank 21 to reduce to a minimum the intermingling of the incoming cold water and the hot water at the top.

Hot water from the upper end of the water tank 21 flows through a discharge water line 26 that may be formed of copper tubing. The intake end of the water line 26 opens into the upper end of the water tank 21 through an apertured boss 27 that is formed integrally with the cover 22. On the other end of the discharge water line 26, FIG. 2, there is a discharge head 28 which is arranged to spray hot water over ground coffee 29 on a cup shaped member 30 of filter paper which is supported in a removable funnel 31 having a stepped interior configuration. The funnel 31 preferably is formed of nonmetallic heat insulating material such as that previously referred to. At its lower end the funnel 31 has a discharge spout 32 for directing the flow of coffee extract into a beaker 33 that may be formed of glass. The beaker 33 is seated on a base warmer 34, FIG. 7, that is arranged to be maintained at an elevated temperature by an electric heating element 35. The base warmer 37 is mounted on a frame 36 that is formed of a plastic insulating material, such as a phenolic condensation product that is capable of withstanding the temperature to which the warmer 34 may be heated by the element 35. The frame 36 is mounted on the base member 11 which is provided with inclined side flanges 37 along the edges of a floor 38. The base member 11 provided with the inclined side flanges 37 interconnected by the floor 38 extends the full length of the beverage making machine 10 and preferably is formed of extruded metal such as aluminum. A threaded stud 39 serves to secure the base warmer 34 in place within the frame 36 and on the floor 38. A locating stud 39', FIG. 2, extends from the base warmer 34 into an aperture in the floor 38 to prevent rotation of the base warmer 34 relative to the base member 11.

For heating water in the tank 21 and maintaining it at a beverage making temperature, a U-shaped electric water heating element 40 is employed. The upper ends of the branches of the U-shaped electric water heating element 40 extend through openings 41, FIGS. 3, 5, and 6A, in the cover 22. For controlling the energization of the heating element 40 to maintain the temperature of the water at a predetermined value a temperature response element 42 is employed and extends into the tank 21 where it is completely immersed in the water when the tank 21 is filled. The temperature response element 42 is arranged to be inserted through a relatively large diameter opening 43 in the cover 22 which opening, FIG. 6, is thereafter closed by a plug 44 of the same material as that of which the cover 22 is formed. The temperature response element 42 is maintained in a fixed position within the water tank 21 by depending fingers 45 that are molded integrally with the cover 22. The fingers 45 serve to position the temperature response element 42 symmetrically with respect to the arms of the U-shaped heating element 40 as shown in FIG. 9. A retaining band 46, FIG. 6, surrounds the lower ends of the fingers 45 and holds them in snug fitting engagement with the temperature response element 42.

A suitable connection extends from the temperature response element 42 through the cover 22, FIG. 2, to a thermostat control 47 that is shown in broken line outline. The thermostat control 47 includes thermostat contacts 48, FIG. 10, that are arranged to be closed and opened under the control of the temperature response element 42 in known manner to control the energization and deenergization of the electric water heating element 40 from conductors 49 and 50 that are connected to a plug 51 which is arranged for connection to a suitable current source such as 115 volt 60 cycle alternating current source.

As long as the level of the water in the tank 21 remains adjacent the lower end of the apertured boss 27 as shown in FIG. 2, the temperature to which the water tank 21 and cover 22 are subjected can be controlled by the temperature response element 42 and thermostat control 47 such that a temperature of the order of 200° F. is not exceeded. However, there is the possibility that the water level might fall substantially from the level just referred to or the plug 51 might be connected to an energized source with no water in the tank 21. In such case there is the possibility that the temperature to which the water tank 21 and cover 22 are subjected would substantially exceed the temperature to which they are subjected when the tank 21 is filled with water to the level indicated. Under such abnormal conditions, particularly an empty tank 21, the thermostat response element 42 and thermostat control 47 may not respond with sufficient rapidity to open the contacts 48 and deenergize the heating element 40. If the tank 21 and cover 22 were formed of metal, this would be of no particular consequence. However, when the tank 21 and the cover 22 are formed of a plastic material, then it is desirable to provide additional means responsive to ambient temperature for opening the circuit to the heating element 40. For this purpose, as shown in FIGS. 6A and 10, a heat sensitive fuse 52 is incorporated in series with the circuit to the heating element 40. It is arranged to open the circuit, not in response to increase in current flow, but in response to the ambient temperature exceeding a predetermined value, for example 208° F. Heat sensitive fuse 52 is located in the upper end of a metallic sleeve 53 which extends through an opening 54, FIG. 3, in the cover 22. The metallic sleeve 53 is in the form of a tube of good conducting metal such as copper and, as shown in FIG. 2, extends downwardly along one of the legs of the U-shaped heating element 40. The metallic sleeve 53 may be open at its lower end. A metallic connector sleeve 55 serves to position the metallic sleeve 53 in spaced relation to the adjacent arm of the U-shaped heating element 40. Also the sleeve 55 serves to conduct heat to the metallic sleeve 53. By varying the position of the metallic connector sleeve 55 along the metallic sleeve 53 and the adjacent arm of the U-shaped heating element 40, it is possible to vary the temperature to which the heat sensitive fuse 52 is subjected. The arrangement is such that, should the heat sensitive fuse 52 be subjected to an ambient temperature somewhat higher than the normal temperature at which the water in the upper end of the tank 21 is maintained which would indicate an abnormal operating condition, the fuse 52 operates to interrupt the circuit to the heating element 40. This requires that the blown fuse 52 be replaced and the circuit to the heating element 40 re-established before it again can be energized. As shown in FIGS. 3, 6 and 6A an upstanding flange 58 is formed integrally with the cover 22 around the openings 41, 43 and 54 and the opening through the apertured boss 27. After the intake end of the discharge water line 26 has been placed in position as shown in FIG. 6 together with the heating element 40, temperature response element 42, plug 44 and the metallic sleeve 53, a suitable potting compound 59 is poured into the cavity defined by the flange 58 and allowed to set. The discharge water line 26 is properly located between the pair of upstanding pins 60 that are molded integrally with the flange 58. The potting compound 59 may be a synthetic rubber base material which is capable of withstanding substantially the same temperature as the cover 22. The use of the potting compound 59 obviates the necessity for employing threaded clamp fittings for the various parts that are held in proper operative relation on the cover 22.

The cover 22, FIGS. 2 and 6, has a peripheral flange 61 in which is molded a downwardly facing annular groove 62 for receiving a sealing ring 63, such as O-ring, to provide sealed engagement with a peripheral flange 64 that is molded integrally with the upper end of the water tank 21. Apertured bosses 65 and 66 are molded integrally with the peripheral flange 64 of the tank 21 and are arranged to receive self tapping screws 67 and 68.

Formed integrally with the cover 22, FIGS. 2, 3, 4 and 5, is a vent tube 69 that is provided near its upper closed end with a transverse aperture 70. The vent tube 69 extends into the basin 18 through a suitable opening in the bottom of the relatively deep portion 19 and to one side of the opening for the inlet water line 20. The opening through the vent tube 69 into the basin 18 with the aperture 70 above the level of the water in the basin 18 places the upper end of the water tank 21 always in communication with the atomsphere and thus prevents the development of pressure in excess of atmospheric pressure.

The trunk means 12, FIG. 9, encloses the major lower portion of the water tank 21. It includes trunk side members 74 that may be formed of extruded metal such as aluminum. Formed integrally with the trunk side members 74 are inwardly extending flanges 75 and 76 which are provided with endwise extending grooves 77 and 78 for receiving self tapping screws at their upper and lower ends. The trunk side members 74 extend upwardly from the floor 38 of the base member 11 and the self tapping screws extend therethrough and into the lower ends of the grooves 77 and 78. Along their forward edges the trunk side members 74 have grooves 79 that face each other for receiving the sides of a front trunk wrapper 80 that may be formed of stainless steel sheet. A forward extension 81, FIGS. 2 and 8, extends from the upper end of the front trunk wrapper 80 and it has an upwardly indented portion 82 for receiving the discharge end of the water line 26. The discharge head 28 is located within the space defined by the indented portion 82. At its lower end the front trunk wrapper 80 has a forward extension or flange 83 which underlies the rear edge of the frame 36. Along the rear edges of the trunk side members 74 rearwardly facing grooves 84 are formed for receiving forward edges 85 of a rear trunk wrapper 86 which extends along three sides of the water tank 21 and is formed of sheet metal, such as aluminum, to which a decorative coating can be applied. Likewise a decorative coating can be applied to the trunk side members 74. Top and bottom flanges 87 and 88, FIG. 2, extend forwardly from the central rear portion of the rear trunk wrapper 86 and are secured in place by screws 89. At the lower end of the rear trunk wrapper 86 the bottom flange 88 underlies the floor 38 of the base member 11 and the screws 89 extend therethrough.

The upper end of the tank 21 and the basin 18 are enclosed by the hood means 13 which includes hood side members 92, FIG. 8, that are formed of extruded metal, such as aluminum. Inwardly extending shelves 93 provide supports for an outstanding flange 94 of the basin 18. Above the shelves 93 are inwardly facing slots 95 for receiving outwardly extending flanges 96 on the lid 14 for slidably positioning it in overlying relation to the basin 18. While the lid 14 is shown as being slidably mounted in the slots 95, it will be understood that it can be hinged to the hood means 13. Grooves 97 are formed in the hood side members 92 along the upper and lower edges for receiving self tapping screws at the rear end for a purpose to be described. Along the lower edges of the hood side members 92 there are formed inwardly extending flanges 98 that are arranged to receive screws, such as screws 99, which extend into the upper ends of the grooves 78, FIG. 9, for securing the upper ends of the trunk side members 74 to the hood side members 92. The sides of the forward extension 81 from the front trunk wrapper 80 extend into inwardly facing slots 100 along the lower edges of the hood side members 92. Along the extreme lower edges of the hood side members 92 inwardly extending flanges 101 are formed to provide runners or rail members for slidably supporting an outstanding flange 102 on the funnel 31. Suitable decorative coatings can be applied to the outer surfaces of the hood side members 92. In FIG. 2 it will be observed that the top flange 87 overlies the rear end of the inwardly extending flange 98 and that the screw 89 extends therethrough.

The hood means 13 also includes a front end cap 105, FIG. 2, that is formed of non-metallic heat insulating material of the kind above referred to. The front end cap 105 is a one piece molding and includes upper and lower rearwardly extending integral tabs 106 and 107. The upper tabs 106 underlie a forwardly extending flange 108 on the basin 18 while the lower tabs 107 overlie the respective inwardly extending flange 98 from the hood side members 92. Screws 109 serve to hold the front end cap 105 in position as indicated. At the rear end of the hood means 13 and closing off the space at the rear ends of the hood side members 92 is a rear end cap 110 that is formed of non-metallic heat insulating material of the kind above referred to. Screws (not shown) extend through the rear end cap 110 into the rear ends of the grooves 97, FIG. 8, to secure the rear end cap 110 in position.

A combination switch and indicating lamp 113 is mounted on the front end cap 105. It includes switch contacts 114, FIG. 10, that are arranged to complete an energizing circuit for the base warmer element 35. As a part of the fitting 113 a neon indicating lamp 115 is employed and is connected across the base warmer element 35. The arrangement is such that, when the contacts 114 are closed, the base warmer element 35 is connected for energization across the conductors 45 and 50 and the neon lamp 115 is energized to indicate that this condition exists. In FIG. 2 the various conductors to the heating element 40, thermostat control 47 and combination switch and indicating lamp fitting 113 are indicated at 116. Attention is called to the fact that these conductors 116 underlie the basin 18 that is formed of non-metallic heat insulating material. Also, the basin 18 is securely held in this overlying position and tools are required in order to remove it to permit access to the conductors 116. This arrangement effectively prevents access to the conductors 116 which are energized when the plug 51 is inserted in an energized socket. However, the cover 14 can be readily removed to permit access to the basin 18 for cleaning. If desired, the cover 14 can be secured against sliding movement by a readily removable screw.

When it is desired to withdraw a quantity of hot water from the tank 21 for the purpose of making tea, soup, etc., it may be undesirable to use the funnel 31 which has been used previously for making coffee extract. For this purpose a shallow funnel 119, FIG. 11, may be employed. The funnel 119 can be applied to the inwardly extending flanges 101 in the same manner that the outstanding flange 102 on the funnel 31 is applied.

FIG. 12 shows, generally, at 120 an alternate embodiment of a basin which can be employed instead of the basin 18 previously described and it has a rim 121 of inverted U-shape which is arranged to overlie the upper edges of the hood side members 92 and the upper edges of the front and rear end caps 105 and 110. By employing the rim 121 of inverted U-shape there is no likelihood that water poured into the basin 120 will overflow it inside of the hood means 13. A snap type or hinged type cover can be mounted on the basin 120 for closing it while permitting ready acces for cleaning. Such a cover includes a screened opening 15 through which the cold water can be poured from the pitcher 17 or the like as described previously.

In the operation of the beverage making machine 10, sufficient cold water is poured into the basin 18 through the screened opening 15 in the cover 14 to fill the tank 21 to the level indicated. Then the plug 51 is inserted in an energized socket and sufficient time allowed to permit the water in the tank 21 to be heated to the desired temperature and the thermostat control 47 has been operated to open contacts 48. The water in the tank 21 will be maintained at this temperature under the control of the thermostat contacts 48 the closure of which is controlled by the temperature response element 42 in known manner. The desired amount of ground coffee 29 corresponding to the amount of coffee extract to be made is placed on the filter paper 30 in the funnel 31 and the assembly then is applied to the inwardly extending flanges 101 on the lower edges of the hood side members 92 until the ground coffee 29 is centered with respect to the discharge head 28. Contacts 114 of the combination switch and indicating lamp fitting 113 are closed and the neon lamp 115 is lighted to indicate that the base warmer element 35 is energized. The desired amount of cold water is poured from the pitcher 17 through the screened opening 15 in the cover 14 into the basin 18. The cold water flows into the relatively deep portion 19 of the basin 18 and into the upper end of the inlet water line 20. It is discharged at its lower end into the lower end of the tank 21 and displaces hot water at the top to fill the discharge water line 26 which starts the siphon action resulting in flow of hot water from the upper end of the tank 21 to the discharge head 28 where it is sprayed over the ground coffee 29 and the coffee extract flows through the discharge spout 32 into the beaker 33 on the base warmer 34 which now is energized. Hot water continues to flow through the discharge water line 26 until the siphon action is completed. It will be understood that the amount of ground coffee 29 placed on the filter paper 30 in the funnel 31 is related to the amount of cold water that is poured from the pitcher 17 into the basin 18. For example, anywhere from two to eight cups of cold water can be poured into the basin 18 and a corresponding number of cups of coffee extract will flow into the beaker 33. After the flow of coffee extract ceases from the funnel 31, it is removed and turned upside down to release the filter paper 30 and spent coffee grounds. When only hot water is to be withdrawn from the machine 10, the shallow funnel 119 is employed and hot water then flows into the beaker 33 in an amount corresponding to the amount of cold water poured from the pitcher 17 into the basin 18.

In FIGS. 13–17 another embodiment of the invention is shown. For this embodiment the previously described water tank 21 and cover 22 of non-metallic heat insulating material are employed together with the discharge waterline 26 and discharge head 28. Also the thermostat control 47 is employed. The beverage making machine shown in these figures is indicated, generally, at 122 and includes trunk means 123 enclosing the major portion of the water tank 21. The trunk means 123 is formed by side and rear sections 124 and 125, FIG. 16, having corner post sections 126 and 127 that are apertured to receive screws, such as the screw 128, FIGS. 14–15, to secure the trunk means 123 to a base 129 that may be formed entirely of a non-metallic heat insulating material such as the material above referred to or it may be formed of a phenolic condensation product. The base warmer 34 is mounted on the forward end of the base 129.

For enclosing the upper end of the water tank 21 hood means, shown generally at 130, is employed. The hood means include side, front and rear sections 131, 132 and 133 which are integral and also are integral with a cold water basin that is indicated, generally, at 134. The cold water basin 134 has an inclined floor 135 and a relatively deep portion 136 to which the inlet water line to the water tank 21 is connected.

The trunk means 123 and hood means 130 including the inclined floor 135 of the basin 134 are formed of the non-metallic heat insulating material referred to above as a one piece molding which is indicated, generally, at 137. The formation of the one piece molding including the trunk means 123 and hood means 130 provides a relatively strong and neat appearing enclosure for the water tank 21 and associated parts going to make up the beverage making machine 122.

The enclosure is completed by a front section 138 which also is a molding of non-metallic heat insulating material such as that above referred to. A forward extension 139 from the front section 138 has a recessed portion 140 for receiving the discharge head 28. The vertical sides of the front section 138 extend into inwardly facing slots 141 that are formed in the corner post sections 127. Formed integrally with the forward extension 139 is an upstanding flange 142 on which the thermostat control 47 can be mounted. Screws, such as the screw 143, FIG. 14, extend through the forward extension 139 to secure it to the side sections 131. The side sections 131 are stepped as indicated at 145 and 146 in order to provide increased strength for the hood means 130.

For supporting the funnel 31 rail members 147 of suitable cross section and formed of non-metallic heat insulating material are adhesively secured to the upper ends of the side sections 124 of the trunk means 123 as seen in FIG. 14. The outstanding flange 102 on the funnel 131 is arranged to slide along the upper sides of the rail members 147.

The cold water basin 134 is provided with a removable cover 148 which has a pouring opening 149, FIG. 15. A rib 150, FIG. 14, extends along the upper edges of the side sections 131 of the hood means 130 and a flange 141 depending from the sides of the cover 148 overlies this rib. A lip 152 extending from the lower edge of the flange 141 is arranged to underlie the rib 150 for holding the cover 148 in place. However, since the cover 148 is somewhat flexible because it is formed of non-metallic heat insulating material of the kind above referred to, it can be applied by a snap action to cover the cold water basin 134 and in a similar manner it can be removed. A cover 153 is provided of non-metallic heat insulating material to overlie the pouring opening 149.

In FIG. 17 a modified arrangement for applying a cover 156 to the cold water basin 134 is shown. The cover 156 is provided with a depending outwardly flared flange 157 along its periphery. A notch 158 is provided not only along the upper edges of the side sections 131 but also along the front and rear sections 132 and 133 of the hood means 130 for receiving the depending flange 157 of the cover 156.

What is claimed as new is:

1. A machine for heating water for making varying amounts of coffee extract and for other purposes comprising
   a water tank,
   means for electrically heating water in said tank,
   discharge means in spaced relation to said water tank,
   a discharge water line interconnecting said water tank and said discharge means,
   means underneath said discharge means for receiving hot water therefrom,
   hood means enclosing the upper end of said water tank and said discharge water line,
   electrically energizable means in said hood means for said heating means,
   an inlet water line for said water tank opening upwardly in said hood means, and
   a cold water receiving basin of electrical and heat insulating material connected at its bottom to said inlet water line, closing off said hood means, and overlying said water tank and said electrically energizable means whereby access thereto is permitted on removal of said basin.

2. The machine according to claim 1 wherein said basin is of rectangular shallow configuration with that portion connected to said inlet water line being relatively deeper than the remaining portion whereby an amount of cold water substantially less than that required to fill said basin will flow into said water tank.

3. The machine according to claim 1 wherein vent means extend from the upper end of said water tank through said bottom of said basin and place said tank in communication with the atmosphere above the level of the water in said basin.

4. The machine according to claim 1 wherein a lid overlies said basin, is removable to permit access thereto for cleaning and other purposes, and has an opening through which cold water can be poured into said basin.

5. The machine according to claim 1 wherein said basin has a rim having an inverted U-shaped cross section overlying said hood means.

6. A machine for heating water for making varying amounts of coffee extract and for other purposes comprising a water tank,
means for heating water in said tank,
a base member underlying said water tank,
discharge means in spaced relation to said water tank,
a discharge water line interconnecting said water tank and said discharge means,
means underneath said discharge means for receiving hot water therefrom,
trunk means enclosing said water tank and including
a pair of trunk side members secured to and extending upwardly from said base on opposite sides of said water tank,
a front trunk wrapper interconnecting the front sides of said trunk members, extending across the front side of said water tank, and having a forward extension at its upper end for receiving said discharge water line, and
a rear trunk wrapper interconnecting rear sides of said trunk side members and extending around the rear side of said water tank,
hood means enclosing the upper end of said water tank and said discharge water line and including
a pair of hood side members on opposite sides of and extending transversely and above the upper end of said water tank, receiving said forward extension of said front trunk wrapper, and secured to the upper ends of the respective trunk side members, and
front and rear end caps extending transversely and secured to the front and rear ends respectively of said hood side members,
an inlet water line for said water tank opening upwardly in said hood means, and
a cold water receiving basin in said hood means connected at its bottom to said inlet water line.

7. The machine according to claim 6 wherein a cover for said basin is movably mounted on said hood means and has an opening through which cold water can be poured into said basin.

8. The machine according to claim 6 wherein
said base member, said trunk side members, and said hood side members are extruded metal members, and
said front and rear trunk wrappers are sheet metal members.

9. The machine according to claim 6 wherein said hood side members have
inwardly extending flanges along their lower edges for slidably supporting said hot water receiving means, and
inwardly facing grooves along their upper edges, and
a cover for said hood means and basin is slidably mounted in said inwardly facing grooves and has an opening through which cold water can be poured into said basin.

10. A machine for heating water for making varying amounts of coffee extract and for other purposes comprising
a water tank formed of non-meallic heat insulating material likely to be damaged when subjected to a predetermined temperature,
means for electrically heating water in said tank,
ambient temperatures responsive means connected to said heating means for interrupting the flow of electrical current thereto before said predetermined temperature is reached,
discharge means in spaced relation to said water tank,
a discharge water line interconnecting said water tank and said discharge means,
means underneath said discharge means for receiving hot water therefrom,
an inlet water line for said water tank, and
a cold water basin connected at its bottom to said inlet water line.

11. The machine according to claim 10 wherein said water tank is likely to be damaged when it is subjected to a temperature above about 375° F. and said ambient temperature responsive means operates to interrupt said current flow to said heating means at a temperature of about 208° F.

12. The machine according to claim 10 wherein said heating means includes
an electric heater element in said tank adapted to be immersed in the water therein,
thermostat contacts for connecting said heater element to a source of electric current, and
temperature responsive means in said tank adapted to be immersed in the water therein and arranged to control the opening and closing of said contacts, and
said ambient temperature responsive means is connected in series with said electric heater element, is responsive to the ambient temperature in said tank, and is arranged to operate when the level of the water in said tank is lowered to a level such that the operating temperature for said ambient temperature responsive means is reached.

13. The machine according to claim 12 wherein
a good heat conductor extending below the intake end of said discharge water line in said water tank carries said ambient temperature responsive means, 14. The machine according to claim 13 wherein
said good heat conductor is juxtaposed to said electric heater element, and
good heat conducting means interconnect said good heat conductor and said electric heater element.

15. The machine according to claim 14 wherein
said electric heater element is generally U-shaped with the ends extending upwardly through the upper end of said tank,
said good heat conductor extends along one of the arms of said heater element, and
said good heat conducting means is connected to said one arm.

16. The machine according to claim 13 wherein
said water tank includes a cover having openings through which said electric heater element, said discharge water line, said temperature responsive means, and said good heat conductor ambient temperature responsive carrying means extend, and
a potting compound securing them in fixed relation to said cover.

17. The machine according to claim 12 wherein
said electric heater element is generally U-shaped with the ends extending upwardly through the upper end of said tank,
said temperature responsive means is located between the arms of said heater element, and
spacing means depending from said upper end of said tank hold said temperature responsive means in spaced relation to said arms.

18. A machine for heating water for making varying amounts of coffee extract and for other purposes comprising
a water tank, means for heating water in said tank,
a base member underlying said water tank,
discharge means in spaced relation to said water tank,
a discharge water line interconnecting said water tank and said discharge means,
means underneath said discharge means for receiving hot water therefrom,
trunk means enclosing said water tank and including
    side and rear sections secured to and extending upwardly from said base, and
    a front section interconnecting the front sides of said sections and having a forward extension at its upper end for receiving said discharge water line,
hood means integral with said side and rear sections and enclosing the upper end of said water tank and said discharge water line and receiving said forward extension of said front section,
an inlet water line for said water tank opening upwardly in said hood means, and
a cold water receiving basin integral with said hood means and connected at its bottom to said inlet water line,
said side and rear sections of said trunk means, said hood means, and said basin comprising a one piece molding of non-metallic heat insulating material.

References Cited

UNITED STATES PATENTS

| | | | |
|---|---|---|---|
| 3,220,334 | 11/1965 | Martin | 99—282 |
| 3,261,279 | 7/1966 | Kaplan | 99—282 |
| 3,332,337 | 7/1967 | Lowry | 99—282 |
| 3,354,810 | 11/1967 | Lorang | 99—282 |

ROBERT W. JENKINS, *Primary Examiner.*